US009544883B2

(12) United States Patent
Tang (10) Patent No.: US 9,544,883 B2
(45) Date of Patent: Jan. 10, 2017

(54) METHOD AND DEVICE FOR TRANSMITTING INFORMATION

(71) Applicant: Huawei Technologies Co., LTD., Shenzhen (CN)

(72) Inventor: Zhenfei Tang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 14/272,964

(22) Filed: May 8, 2014

(65) Prior Publication Data

US 2014/0241295 A1  Aug. 28, 2014

Related U.S. Application Data

(63) Continuation of application No. PCT/CN2012/084059, filed on Nov. 5, 2012.

(30) Foreign Application Priority Data

Nov. 9, 2011  (CN) .......................... 2011 1 0352496

(51) Int. Cl.
*H04W 72/04* (2009.01)
*H04L 1/00* (2006.01)

(52) U.S. Cl.
CPC ........ *H04W 72/0413* (2013.01); *H04L 1/0029* (2013.01); *H04L 1/0032* (2013.01)

(58) Field of Classification Search
CPC .............................. H04W 84/18; H04W 84/12
See application file for complete search history.

(56) References Cited

U.S. PATENT DOCUMENTS

2011/0142000 A1\* 6/2011 Han ...................... H04L 5/0053
370/329
2011/0243066 A1  10/2011 Nayeb Nazar et al.
(Continued)

FOREIGN PATENT DOCUMENTS

CN  101860425 A  10/2010
CN  101997659 A   3/2011
(Continued)

OTHER PUBLICATIONS

LG Electronics, "Performance Comparisons of CA PUCCH Formats" Agenda Item 6.2.4.1, 3GPP TSG RAN WG1 #61, Montreal, Canada, May 10-14, 2010, 8 pages.
(Continued)

*Primary Examiner* — Andrew Lai
*Assistant Examiner* — Zhiren Qin
(74) *Attorney, Agent, or Firm* — Brinks Gilson & Lione (57) ABSTRACT

The present disclosure provides a method and device for transmitting information. The method includes: configuring a first physical uplink control channel format and a second physical uplink control channel for a user equipment first. An orthogonal sequence of the first physical uplink control channel format and an orthogonal sequence of the second physical uplink control channel format correspond to different expansion factors. Then the user equipment selects one of the physical uplink control channel format and the second physical uplink control channel format to transmit the feedback information.

10 Claims, 4 Drawing Sheets

(56) References Cited

U.S. PATENT DOCUMENTS

| | | | |
|---|---|---|---|
| 2011/0280164 A1* | 11/2011 | Luo | H04L 5/001 370/281 |
| 2012/0294272 A1* | 11/2012 | Han | H04L 1/0027 370/329 |
| 2013/0039334 A1 | 2/2013 | Han et al. | |
| 2013/0201841 A1* | 8/2013 | Zhang | H04L 1/1607 370/252 |

FOREIGN PATENT DOCUMENTS

| | | |
|---|---|---|
| CN | 102111254 A | 6/2011 |
| CN | 102158326 A | 8/2011 |
| CN | 102158969 A | 8/2011 |
| WO | WO 2010101805 A2 | 9/2010 |
| WO | WO 2011/132987 A2 | 10/2011 |
| WO | WO 2011/137408 A2 | 11/2011 |

OTHER PUBLICATIONS

Lte, "$3^{rd}$ Generation Partnership Project (3GPP); Technical Specification Group Radio Access Network; Evolved Universal Terrestrial Radio Access (E-UTRA); Multiplexing and channel coding" (Release 10) 3GPP TS 36.212, vol. 10.2.0, Jun. 2011, pp. 1-78.

Lte, "$3^{rd}$ Generation Partnership Project (3GPP); Technical Specification Group Radio Access Network; Evolved Universal Terrestrial Radio Access (E-UTRA); Physical Channels and Modulation" (Release 10) 3GPP TS 36.211, vol. 10.3.0, Sep. 2011, pp. 1-103.

Lte, "$3^{rd}$ Generation Partnership Project (3GPP); Technical Specification Group Radio Access Network; Evolved Universal Terrestrial Radio Access (E-UTRA); Physical layer procedures" (Release 10) 3GPP TS 36.213, vol. 10.3.0, Sep. 2011, pp. 1-222.

* cited by examiner

| sequence number ($n_{oc}$) | orthogonal sequence $[w_{n_{oc}}(0) \cdots w_{n_{oc}}(N_{SF}^{PUCCH}-1)]$ expansion factor $N_{SF}^{PUCCH}=3$ |
|---|---|
| 0 | $[1\ 1\ 1]$ |
| 1 | $[1\ e^{j2\pi/3}\ e^{j4\pi/3}]$ |
| 2 | $[1\ e^{j4\pi/3}\ e^{j2\pi/3}]$ |

Fig. 6

| sequence number ($n_{oc}$) | orthogonal sequence $[w_{n_{oc}}(0) \cdots w_{n_{oc}}(N_{SF}^{PUCCH}-1)]$ expansion factor $N_{SF}^{PUCCH}=6$ |
|---|---|
| 0 | $[1 \ 1 \ 1 \ 1 \ 1 \ 1]$ |
| 1 | $[1 \ e^{j2\pi/3} \ e^{j4\pi/3} \ 1 \ e^{j2\pi/3} \ e^{j4\pi/3}]$ |
| 2 | $[1 \ e^{j4\pi/3} \ e^{j2\pi/3} \ 1 \ e^{j4\pi/3} \ e^{j2\pi/3}]$ |
| 3 | $[1 \ 1 \ 1 \ -1 \ -1 \ -1]$ |
| 4 | $[1 \ e^{j2\pi/3} \ e^{j4\pi/3} \ -1 \ -e^{j2\pi/3} \ -e^{j4\pi/3}]$ |
| 5 | $[1 \ e^{j4\pi/3} \ e^{j2\pi/3} \ -1 \ -e^{j4\pi/3} \ -e^{j2\pi/3}]$ |

Fig.7

METHOD AND DEVICE FOR TRANSMITTING INFORMATION

CROSS-REFERENCE TO RELATED APPLICATIONS

This application is a continuation of International Application No. PCT/CN2012/084059, filed on Nov. 5, 2012, which claims priority to Chinese Patent Application No. 201110352496.5, filed on Nov. 9, 2011, both of which are hereby incorporated by reference in their entireties.

FIELD

The present disclosure relates to communication systems filed, and more particular to a method and device for transmitting information.

BACKGROUND

In an LTE (Long Term Evolution, long term evolution) communication system supporting carrier aggregation, a UE (user equipment, user equipment) measures channels of multiple downlink cells (or called as carriers) to obtain multiple downlink CSI (channel state information, channel state information). The UE needs to feed the CSI back to an eNB (evolved NodeB, evolved NodeB), and the eNB performs downlink data scheduling by using the CSI. In the prior art, cyclic CSI of one cell is merely fed back on a PUCCH (physical uplink control channel, physical uplink control channel) Format 2/2a/2b of a subframe; and CSI of different cells is fed back on different subframes through different high-level configurations. In aforementioned feedback mode adopting the PUCCH Format 2/2a/2b, the number of feedback bits supported by one subframe is 1-11 bit (bit). The aforementioned feedback mode adopting the PUCCH Format 2/2a/2b may feed back a few bits and has long feedback delay. Therefore, a scheme for cyclically feeding back CSI of multiple cells in one subframe is proposed in the prior art. For example, cyclic CSI is transmitted on a PUSCH (physical uplink sharing channel, physical uplink sharing channel); and cyclic CSI is transmitted on a PUCCH format 3, and so on. However, in the communication system adopting a carrier aggregation technology, as quantity of activated serving cells is continually changed, a type of cyclic CSI reported in one subframe is also changed; so the number of bits fed back in one subframe is continually changed. The aforementioned prior art can not meet a condition that information (such as bit number) fed back in one subframe is changed.

SUMMARY

All aspects of the present disclosure provide a method and device for transmitting information, for realizing the condition that information fed back in one subframe is changed.

One aspect of the present disclosure provides a method for transmitting feedback information. The method include: acquiring, by a user equipment, a first physical uplink control channel format and a second physical uplink control channel format configured for the user equipment by a base station. An orthogonal sequence of the first physical uplink control channel format and an orthogonal sequence of the second physical uplink control channel format correspond to different expansion factors. The user equipment selects one of the first physical uplink control channel format and the second physical uplink control channel format to transmit the feedback information.

Another aspect of the present disclosure provides a device for transmitting feedback information. The device includes a processor and a non-transitory storage medium accessible to the processor. The a non-transitory storage medium is configured to store units including: an acquiring unit, configured to acquire a first physical uplink control channel format and a second physical uplink control channel format configured for a user equipment by a base station, wherein, an orthogonal sequence of the first physical uplink control channel format and an orthogonal sequence of the second physical uplink control channel format correspond to different expansion factors; and a transmission selecting unit, configured to select one of the first physical uplink control channel format and the second physical uplink control channel format to transmit the feedback information.

A further aspect of the present disclosure provides a method for transmitting configuration information. The method includes: transmitting, by a base station, the configuration information to a user equipment, the configuration information indicates a first physical uplink control channel format and a second physical uplink control channel format configured for the user equipment by the base station, wherein, an orthogonal sequence of the first physical uplink control channel format and an orthogonal sequence of the second physical uplink control channel format correspond to different expansion factors.

A still further aspect of the present disclosure provides a device for transmitting configuration information. The device includes a processor and a non-transitory storage medium accessible to the processor, the non-transitory storage medium configured to store units including: a transmitting unit, configured to transmit the configuration information to a user equipment, the configuration information indicates a first physical uplink control channel format and a second physical uplink control channel format configured for the user equipment by the base station, wherein, an orthogonal sequence of the first physical uplink control channel format and an orthogonal sequence of the second physical uplink control channel format correspond to different expansion factors.

The method and the device for transmitting information provided in all aspects of the present disclosure enable the user equipment to adaptively select one channel format to transmit the feedback information under the condition that the information fed back in one subframe is changed.

BRIEF DESCRIPTION OF THE DRAWINGS

In order to illustrate the solution in the embodiments of the present disclosure more clearly, brief description will be made below to the drawings required in the embodiments of the present disclosure or the prior art, and apparently, the drawings described below are some embodiments of the present disclosure only, and other drawings could be obtained based on these drawings by those ordinary skilled in this art without creative efforts.

DETAILED DESCRIPTION OF THE DRAWINGS

A clear and complete description of solutions in the embodiments of the present disclosure will be given below, in combination with the accompanying drawings in the embodiments of the present disclosure. Apparently, the embodiments described below are merely a part, but not all, of the embodiments of the present disclosure. All of other embodiments, obtained by those of ordinary skill in the art based on the embodiments of the present disclosure without any inventive efforts, fall into the protection scope of the present disclosure.

To advantages of the solutions of the present disclosure clearer, the present disclosure is illustrated in detail below in combination with the accompanying drawings and the embodiments.

Figure 1:
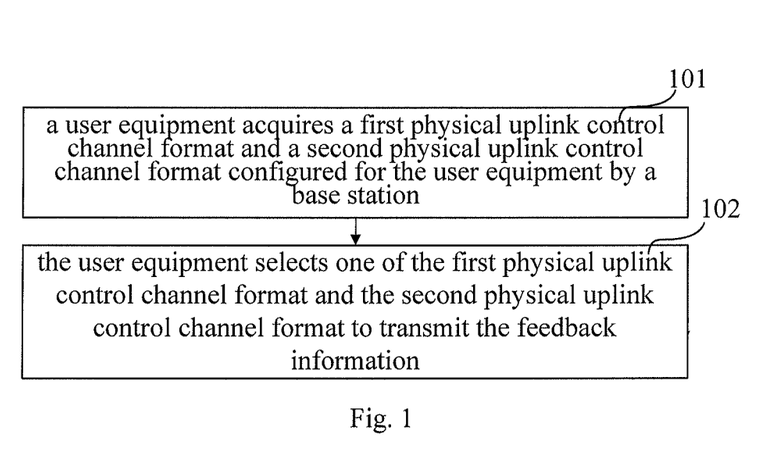
FIG. 1 is a flowchart of a method for transmitting feedback information provided in an embodiment of the present disclosure.

FIG. 1 shows a method for transmitting feedback information provided in an embodiment of the present disclosure. The method includes:

101, a user equipment acquires a first physical uplink control channel format and a second physical uplink control channel format configured for the user equipment by a base station.

An orthogonal sequence of the first physical uplink control channel format and an orthogonal sequence of the second physical uplink control channel format correspond to different expansion factors.

For example, an expansion factor corresponding to the orthogonal sequence of the second physical uplink control channel format is an integral multiple of an expansion factor corresponding to the orthogonal sequence of the first physical uplink control channel format; or, the orthogonal sequence of the second physical uplink control channel format is an expansion or repetition of the orthogonal sequence of the first physical uplink control channel format.

Alternatively, the expansion factor corresponding to the orthogonal sequence of the first physical uplink control channel format is 3, and the orthogonal sequence of the first physical uplink control channel format is at least one orthogonal sequence of [1 1 1], [1 $e^{j2\pi/3}$ $e^{j4\pi/3}$] and [1 $e^{j4\pi/3}$ $e^{j2\pi/3}$]; and the expansion factor corresponding to the orthogonal sequence of the second physical uplink control channel format is 6, and the orthogonal sequence of the second physical uplink control channel format is at least one orthogonal sequence of [1 1 1 1 1 1], [1 $e^{j2\pi/3}$ $e^{j4\pi/3}$ 1 $e^{j2\pi/3}$ $e^{j4\pi/3}$], [1 $e^{j4\pi/3}$ $e^{j2\pi/3}$ 1 $e^{j4\pi/3}$ $e^{j2\pi/3}$], [1 1 1 −1 −1 −1], [1 $e^{j2\pi/3}$ $e^{j4\pi/3}$ −1 −$e^{j2\pi/3}$ −$e^{j4\pi/3}$] and [1 $e^{j4\pi/3}$ $e^{j2\pi/3}$ −1 −$e^{j4\pi/3}$ −$e^{j2\pi/3}$]. In addition, the orthogonal sequence of the first physical uplink control channel format and the orthogonal sequence of the second physical uplink control channel format form an orthogonal sequence pair, and the orthogonal sequence pair is at least one orthogonal sequence pair of a [1 1 1] and [1 1 1 1 1 1] pair, a [1 $e^{j2\pi/3}$ $e^{j4\pi/3}$] and [1 $e^{j2\pi/3}$ $e^{j4\pi/3}$ 1 $e^{j2\pi/3}$ $e^{j4\pi/3}$] pair, a [1 $e^{j4\pi/3}$ $e^{j2\pi/3}$] and [1 $e^{j4\pi/3}$ $e^{j2\pi/3}$ 1 $e^{j4\pi/3}$ $e^{j2\pi/3}$] pair, a [1 1 1] and [1 1 1 −1 −1 −1] pair, a [1 $e^{j2\pi/3}$ $e^{j4\pi/3}$] and [1 $e^{j2\pi/3}$ $e^{j4\pi/3}$ −1 −$e^{j2\pi/3}$ −$e^{j4\pi/3}$] pair and a [1 $e^{j4\pi/3}$ $e^{j2\pi/3}$] and [1 $e^{j4\pi/3}$ $e^{j2\pi/3}$ −1 −$e^{j4\pi/3}$ −$e^{j2\pi/3}$] pair.

For example, when the expansion factor corresponding to the orthogonal sequence of the first physical uplink control channel format is 3, values of resources $n_{oc,0}^{(\tilde{p})}$ (sequence number with port $\tilde{p}$ and time slot 0) and $n_{oc,1}^{(\tilde{p})}$ (sequence number with port $\tilde{p}$ and time slot 1) of the first physical uplink control channel format may be calculated according to formula:

$$n_{oc,0}^{(\tilde{p})} = n_{PUCCH}^{(4,\tilde{p})} \bmod N_{SF,1}^{PUCCH} \qquad \text{formula (1)}$$

$$n_{oc,1}^{(\tilde{p})} = \begin{cases} (2n_{oc,0}^{(\tilde{p})}) \bmod N_{SF,1}^{PUCCH} & \text{if } N_{SF,1}^{PUCCH} = 3 \\ n_{oc,0}^{(\tilde{p})} \bmod N_{SF,1}^{PUCCH} & \text{otherwise} \end{cases},$$

so that the orthogonal sequence of the first physical uplink control channel format is acquired according to $n_{oc,0}^{(\tilde{p})}$ and $n_{oc,1}^{(\tilde{p})}$. Or, values of resources $n_{oc,0}^{(\tilde{p})}$ and $n_{oc,1}^{(\tilde{p})}$ of the second physical uplink control channel format and the corresponding orthogonal sequence of the second physical uplink control channel format are acquired first, the orthogonal sequence of the first physical uplink control channel format is acquired according to a corresponding relation between the orthogonal sequence of the second physical uplink control channel format and the orthogonal sequence of the first physical uplink control channel format in an orthogonal sequence pair.

$n_{PUCCH}^{(4,\tilde{p})}$ expresses a source of the first physical uplink control channel format, and $N_{SF,1}^{PUCCH}$ expresses a size of an expansion factor of time slot 1. A data block transmitted by using the first physical uplink control channel format is expanded according to formula:

$$y_n^{(\tilde{p})}(i) = \qquad \text{formula (2)}$$

$$\begin{cases} w_{n_{oc,0}^{(\tilde{p})}}(\bar{n}) \cdot e^{j\pi\lfloor n_{cs}^{cell}(n_s,l)/64\rfloor/2} \cdot d(i) & n < N_{SF,0}^{PUCCH} \\ w_{n_{oc,0}^{(\tilde{p})}}(\bar{n}) \cdot e^{j\pi\lfloor n_{cs}^{cell}(n_s,l)/64\rfloor/2} \cdot d(N_{sc}^{RB}+i) & n < 2N_{SF,0}^{PUCCH} \\ w_{n_{oc,1}^{(\tilde{p})}}^0(\bar{n}) \cdot e^{j\pi\lfloor n_{cs}^{cell}(n_s,l)/64\rfloor/2} \cdot d(2N_{sc}^{RB}+i) & n < 3N_{SF,0}^{PUCCH} \\ w_{n_{oc,1}^{(\tilde{p})}}^1(\bar{n}) \cdot e^{j\pi\lfloor n_{cs}^{cell}(n_s,l)/64\rfloor/2} \cdot d(3N_{sc}^{RB}+i) & \text{otherwise} \end{cases}$$

$$\bar{n} = n \bmod N_{SF,0}^{PUCCH}$$

$$n = 0, \ldots, 3N_{SF,0}^{PUCCH} + N_{SF,1}^{PUCCH} - 1$$

$$i = 0, 1, \ldots, N_{sc}^{RB} - 1$$

Figure 6:
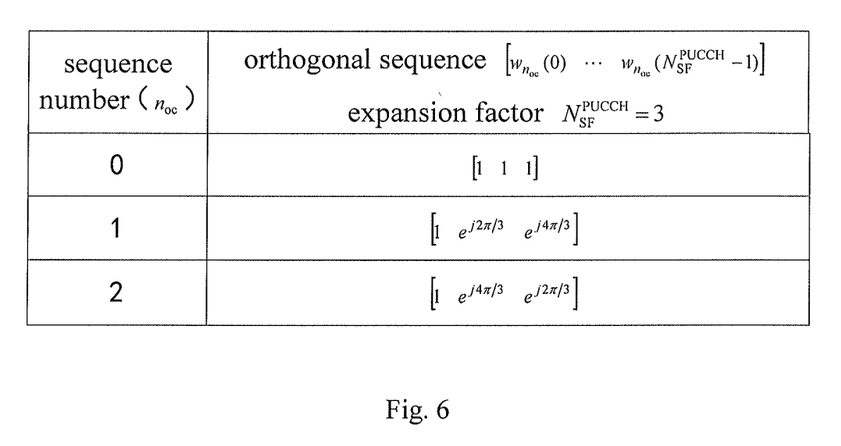
FIG. 6 is an orthogonal sequence table when an expansion factor is 3 provided in an embodiment of the present disclosure.

$d(0), \ldots, d(M_{symb}-1)$ express modulated data by QPSK (Quaternary Phase Shift Keying, quaternary phase shift keying), and $NS_{sc}^{RB}$ expresses how many subcarriers in a RB (Resource Block, resource block). $N_{SF,0}^{PUCCH}$ expresses the size of an expansion factor of first three OFDM (Orthogonal frequency division multiplexing, orthogonal frequency division multiplexing) symbols (an identity of the OFDM symbols 0, 1 and 2 is sub-block 0) of time slot 0 and time slot 1, and $N_{SF,1}^{PUCCH}$ expresses the size of an expansion factor of last three OFDM symbols (an identity of the OFDM symbols 4, 5 and 6 is sub-block 1) of time slot 1. $\tilde{p}$ expresses an antenna port number, and the present disclosure includes but not limited to a condition of one antenna port. $n_{cs}^{cell}(n_s,l)$ is a cell-level cyclic shift parameter, and the present disclosure may include or may not include this parameter. $w_{n_{oc,1}(\tilde{p})}(i)$, $w_{n_{oc,1}(\tilde{p})}^0(i)$ and $w_{n_{oc,1}(\tilde{p})}^1(i)$ are corresponding elements of the orthogonal sequence of time slot 0, time slot 1 sub-block 0 and time slot 1 sub-block 1 of the first physical uplink control channel format respectively. The value of the orthogonal sequence is shown in FIG. 6, and $N_{SF}^{PUCCH}$ expresses the size of an expansion factor. In this embodiment, $w_{n_{oc,1}(\tilde{p})}^0(i)=w_{n_{oc,1}(\tilde{p})}^1(i)$.

When the expansion factor corresponding to the orthogonal sequence of the second physical uplink control channel format is 6, values of resources $n_{oc,0}^{(\tilde{p})}$ (sequence number with port $\tilde{p}$ and time slot 0) and $n_{oc,1}^{(\tilde{p})}$ (sequence number with port $\tilde{p}$ and time slot 1) of the second physical uplink control channel format are calculated according to formula:

$$n_{oc,0}^{(\tilde{p})} = n_{PUCCH}^{(4b,\tilde{p})} \bmod N_{SF,1}^{PUCCH} \quad \text{formula (3)}$$

$$n_{oc,1}^{(\tilde{p})} = \begin{cases} (5n_{oc,0}^{(\tilde{p})}) \bmod N_{SF,1}^{PUCCH} & \text{if } N_{SF,1}^{PUCCH} = 6 \\ n_{oc,0}^{(\tilde{p})} \bmod N_{SF,1}^{PUCCH} & \text{otherwise} \end{cases},$$

so that the orthogonal sequence of the second physical uplink control channel format is acquired according to $n_{oc,0}^{(\tilde{p})}$ and $n_{oc,1}^{(\tilde{p})}$. Or, values of resources $n_{oc,0}^{(\tilde{p})}$ and $n_{oc,1}^{(\tilde{p})}$ of the first physical uplink control channel format and the corresponding orthogonal sequence of the first physical uplink control channel format are acquired first, and then the orthogonal sequence of the second physical uplink control channel format is acquired according to a corresponding relation between the orthogonal sequence of the second physical uplink control channel format and the orthogonal sequence of the first physical uplink control channel format in an orthogonal sequence pair.

$n_{PUCCH}^{(4b,\tilde{p})}$ expresses a source of the second physical uplink control channel format, and $N_{SF,1}^{PUCCH}$ expresses the size of an expansion factor of time slot 1. A data block transmitted by using the second physical uplink control channel format is expanded according to formula:

$$y_n^{(\tilde{p})}(i) = \quad \text{formula (4)}$$

$$\begin{cases} w_{n_{oc,0}(\tilde{p})}(\bar{n}) \cdot e^{j\pi[n_{cs}^{cell}(n_s,l)/64]/2} \cdot d(i) & n < N_{SF,0}^{PUCCH} \\ w_{n_{oc,1}(\tilde{p})}(\bar{n}) \cdot e^{j\pi[n_{cs}^{cell}(n_s,l)/64]/2} \cdot d(N_{sc}^{RB} + i) & \text{otherwise} \end{cases}$$

$$\bar{n} = n \bmod N_{SF,0}^{PUCCH}$$

$$n = 0, \ldots, N_{SF,0}^{PUCCH} + N_{SF,1}^{PUCCH} - 1$$

$$i = 0, 1, \ldots, N_{sc}^{RB} - 1$$

Figure 7:
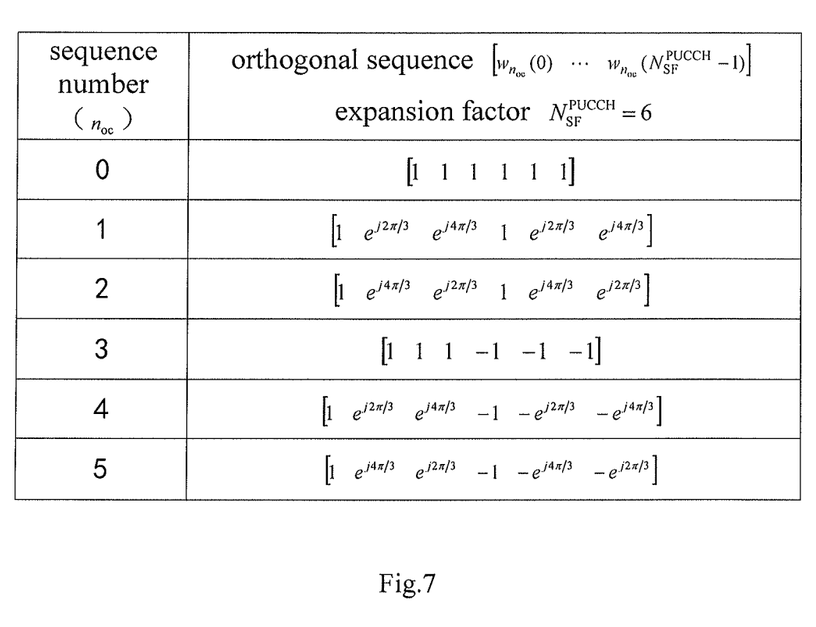
FIG. 7 is an orthogonal sequence table when an expansion factor is 6 provided in an embodiment of the present disclosure.

$d(0), \ldots, d(M_{symb}-1)$ expresses modulated data by QPSK, and $N_{sc}^{RB}$ expresses how many subcarriers in a RB. $N_{SF,0}^{PUCCH}$ and $N_{SF,1}^{PUCCH}$ express the sizes of expansion factors of time slots 0 and 1 respectively. $\tilde{p}$ expresses an antenna port number, and the present disclosure includes but not limited to a condition of one antenna port. $n_{cs}^{cell}(n_s,l)$ is a cell-level cyclic shift parameter, and the present disclosure may include or may not include this parameter. $w_{n_{oc,0}(\tilde{p})}(i)$ and $w_{n_{oc,1}(\tilde{p})}(i)$ are corresponding elements of the orthogonal sequence of time slot 0 and time slot 1 of the second physical uplink control channel format respectively. The value of the orthogonal sequence is shown in FIG. 7, and $N_{SF}^{PUCCH}$ expresses the size of an expansion factor.

Alternatively, the expansion factor corresponding to the orthogonal sequence of the first physical uplink control channel format is 2, and the orthogonal sequence of the first physical uplink control channel format is at least one orthogonal sequence of [1 1] and [1 −1]; and the expansion factor corresponding to the orthogonal sequence of the second physical uplink control channel format is 6, and the orthogonal sequence of the second physical uplink control channel format is at least one orthogonal sequence of [1 1 1 1 1 1], [1 −1 1 −1 1 −1], [1 1 $e^{j2\pi/3}$ $e^{j2\pi/3}$ $e^{j4\pi/3}$ $e^{j4\pi/3}$], [1 −1 $e^{j2\pi/3}$ $-e^{j2\pi/3}$ $e^{j4\pi/3}$ $-e^{j4\pi/3}$], [1 1 $e^{j4\pi/3}$ $e^{j4\pi/3}$ $e^{j2\pi/3}$ $e^{j2\pi/3}$] and [1 −1 $e^{j4\pi/3}$ $-e^{j4\pi/3}$ $e^{j2\pi/3}$ $-e^{j2\pi/3}$]. In addition, the orthogonal sequence of the first physical uplink control channel format and the orthogonal sequence of the second physical uplink control channel format form an orthogonal sequence pair, and the orthogonal sequence pair is at least one orthogonal sequence pair of a [1 1] and [1 1 1 1 1 1] pair, a [1 1] and [1 1 $e^{j2\pi/3}$ $e^{j2\pi/3}$ $e^{j4\pi/3}$ $e^{j4\pi/3}$] pair, a [1 1] and [1 1 $e^{j4\pi/3}$ $e^{j4\pi/3}$ $e^{j2\pi/3}$ $e^{j2\pi/3}$] pair, a [1 −1] and [1 −1 1 −1 1 −1] pair, a [1 −1] and [1 −1 $e^{j2\pi/3}$ $-e^{j2\pi/3}$ $e^{j4\pi/3}$ $-e^{j4\pi/3}$] pair and a [1 −1] and [1 −1 $e^{j4\pi/3}$ $-e^{j4\pi/3}$ $e^{j2\pi/3}$ $-e^{j2\pi/3}$] pair. Wherein, the calculation method of the orthogonal sequence and the expansion method of the data block are similar to the description above, and will not be repeated redundantly herein.

Alternatively, the expansion factor corresponding to the orthogonal sequence of the first physical uplink control channel format is 2, and the orthogonal sequence of the first physical uplink control channel format is at least one orthogonal sequence of [1 1] and [1 −1]; and the expansion factor corresponding to the orthogonal sequence of the second physical uplink control channel format is 4, and the orthogonal sequence of the second physical uplink control channel format is at least one of [1 1 1 1], [1 −1 1 −1], [1 1 −1 −1] and [1 −1 1 −1]. In addition, the orthogonal sequence of the first physical uplink control channel format and the orthogonal sequence of the second physical uplink control channel format form an orthogonal sequence pair, and the orthogonal sequence pair comprises at least one orthogonal sequence pair of a [1 1] and [1 1 1 1] pair, a [1 −1] and [1 −1 1 −1] pair, a [1 1] and [1 1 −1 −1] pair and a [1 −1] and [1 −1 −1 1] pair. Wherein, the calculation method of the orthogonal sequence and the expansion method of the data block are similar to the description above, and repetition is not given herein.

The first physical uplink control channel format and the second physical uplink control channel format adopt different expansion factors, so not only a proper channel format may be adaptively selected according to the change of the feedback information, but also the number of feedback bits supported by one subframe is improved to a great extent.

102, the user equipment selects one of the first physical uplink control channel format and the second physical uplink control channel format to transmit the feedback information.

In this step, the user equipment may select one physical uplink control channel format according to an effective load of the needed feedback information to transmit the feedback information. For example, when the feedback information is CSI of multiple cells reported in one subframe, the user equipment may select the physical uplink control channel format for carrying the feedback information according to the effective load of the CSI of the multiple cells. In this embodiment, the CSI of the multiple cells may be CSI of multiple serving cells of the user equipment or CSI of activated cells. The method for selecting the physical uplink control channel format according to the effective load of the CSI of the multiple cells by the user equipment is illustrated below.

When the effective load is smaller than or equal to a first threshold, the user equipment selects the second physical uplink control channel format to transmit the CSI of the multiple cells.

When the effective load is bigger than the first threshold and smaller than or equal to a second threshold, the user equipment selects the first physical uplink control channel format to transmit the CSI of the multiple cells.

Further, when the effective load is bigger than the second threshold, the user equipment may delete a part of the effective load according to the priority sequence of the CSI, namely, the CSI with low priority is deleted first, so that the effective load is smaller than or equal to the second threshold; in this way, the CSI of the multiple cells may be transmitted by using the first physical uplink control channel format. Under a condition that the priorities are the same, according to the sequence of the cells in a serving cell index table ServeCellIndex, the CSI with the smallest sequence may be reserved.

In this embodiment, the first threshold may be 20 bit, 21 bit, 22 bit, 11 bit, 13 bit or the like; and the second threshold is 55 bit, 63 bit, 71 bit, 40 bit, 50 bit, 48 bit or the like. It should be understood by those skilled in the art that, illustration is merely given herein, and the first threshold and the second threshold may be specifically selected according to the size of actual effective load.

Figure 2:
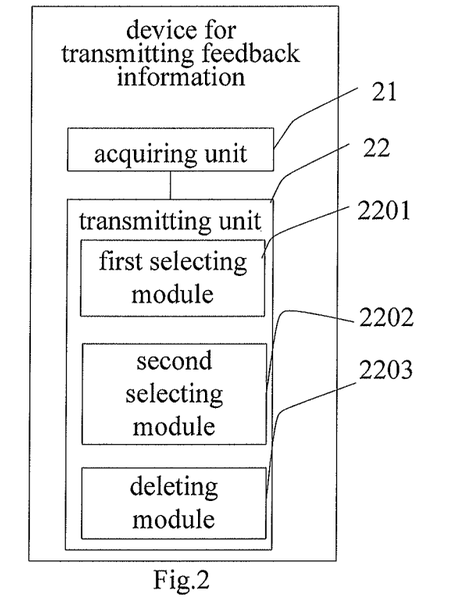
FIG. 2 is a schematic diagram of a structure of a device for transmitting feedback information provided in an embodiment of the present disclosure.

FIG. 2 shows a device for transmitting feedback information provided in an embodiment of the present disclosure. The device includes an acquiring unit 21 and a transmitting unit 22.

The acquiring unit 21 is configured to acquire a first physical uplink control channel format and a second physical uplink control channel format configured for the user equipment by a base station.

An orthogonal sequence of the first physical uplink control channel format and an orthogonal sequence of the second physical uplink control channel format correspond to different expansion factors.

For example, an expansion factor corresponding to the orthogonal sequence of the second physical uplink control channel format is an integral multiple of an expansion factor corresponding to the orthogonal sequence of the first physical uplink control channel format; or, the orthogonal sequence of the second physical uplink control channel format is an expansion or repetition of the orthogonal sequence of the first physical uplink control channel format.

Alternatively, when the expansion factor corresponding to the orthogonal sequence of the first physical uplink control channel format is 3 and the expansion factor corresponding to the orthogonal sequence of the second physical uplink control channel format is 6, for examples of the orthogonal sequence of the first physical uplink control channel format and the orthogonal sequence of the second physical uplink control channel format, reference may be made to the description in the embodiment shown in FIG. 1. In addition, for an orthogonal sequence pair formed by the orthogonal sequence of the first physical uplink control channel format and the orthogonal sequence of the second physical uplink control channel format, reference may also be made to the description in the embodiment shown in FIG. 1, which will not be repeated redundantly herein.

Alternatively, when the expansion factor corresponding to the orthogonal sequence of the first physical uplink control channel format is 2 and the expansion factor corresponding to the orthogonal sequence of the second physical uplink control channel format is 6, for examples of the orthogonal sequence of the first physical uplink control channel format and the orthogonal sequence of the second physical uplink control channel format, reference may be made to the description in the embodiment shown in FIG. 1. In addition, for an orthogonal sequence pair formed by the orthogonal sequence of the first physical uplink control channel format and the orthogonal sequence of the second physical uplink control channel format, reference may also be made to the description in the embodiment shown in FIG. 1, which will not be repeated redundantly herein.

Alternatively, when the expansion factor corresponding to the orthogonal sequence of the first physical uplink control channel format is 2 and the expansion factor corresponding to the orthogonal sequence of the second physical uplink control channel format is 4, for examples of the orthogonal sequence of the first physical uplink control channel format and the orthogonal sequence of the second physical uplink control channel format, reference may be made to the description in the embodiment shown in FIG. 1. In addition, for an orthogonal sequence pair formed by the orthogonal sequence of the first physical uplink control channel format and the orthogonal sequence of the second physical uplink control channel format, reference may also be made to the description in the embodiment shown in FIG. 1, which will not be repeated redundantly herein.

In this embodiment, the first physical uplink control channel format and the second physical uplink control channel format adopt different expansion factors, so not only a proper channel format may be adaptively selected according to the change of the feedback information, but also the number of feedback bits supported by one subframe is improved to a great extent.

The transmitting unit 22 is configured to select one of the first physical uplink control channel format and the second physical uplink control channel format to transmit the feedback information.

The transmitting unit 22 may select one physical uplink control channel format according to an effective load of the needed feedback information to transmit the feedback information. For example, when the feedback information is CSI of multiple cells reported in one subframe, the transmitting unit 22 may select the physical uplink control channel format for carrying the feedback information according to the effective load of the CSI of the multiple cells. In this embodiment, the CSI of the multiple cells may be CSI of multiple serving cells configured for the user equipment by the base station or CSI of activated cells.

In an example, the transmitting unit 22 may further include a first selecting module 2201, a second selecting module 2202 and a deleting module 2203.

The first selecting module 2201 is configured to select, when the effective load is smaller than or equal to a first threshold, the second physical uplink control channel format to transmit the CSI of the multiple cells.

The second selecting module 2202 is configured to select, when the effective load is bigger than the first threshold and smaller than or equal to a second threshold, the first physical uplink control channel format to transmit the CSI of the multiple cells.

The deleting module 2203 is configured to delete, when the effective load is bigger than the second threshold, a part of the effective load according to the priority sequence of the CSI of the multiple cells, so that the effective load is smaller than or equal to the second threshold. For example, when the effective load is bigger than the second threshold, the deleting module 2203 deletes the CSI with low priority, so that the effective load is smaller than or equal to the second threshold; and under a condition that the priorities are the same, according to the sequence of the cells in a serving cell index table ServeCellIndex, the CSI with the smallest sequence is reserved.

In this embodiment, the first threshold may be 20 bit, 21 bit, 22 bit, 11 bit, 13 bit or the like; and the second threshold is 55 bit, 63 bit, 71 bit, 40 bit, 50 bit, 48 bit or the like. It should be understood by those skilled in the art that, illustration is merely given herein, and the first threshold and the second threshold may be specifically selected according to the size of actual effective load.

Figure 3:
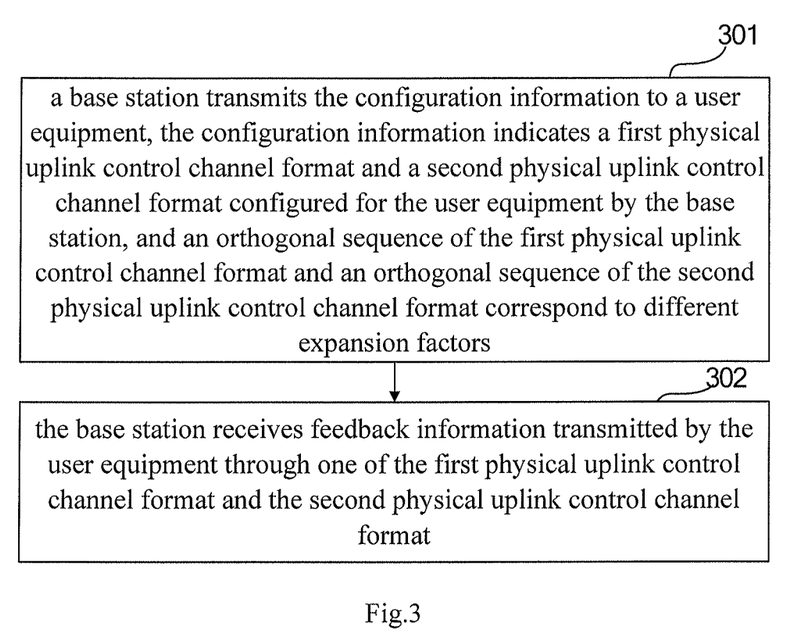
FIG. 3 is a flowchart of a method for transmitting configuration information provided in an embodiment of the present disclosure.

FIG. 3 shows a method for transmitting configuration information provided in an embodiment of the present disclosure. The method includes:

301, a base station transmits the configuration information to a user equipment, the configuration information indicates a first physical uplink control channel format and a second physical uplink control channel format configured for the user equipment by the base station, wherein, an orthogonal sequence of the first physical uplink control channel format and an orthogonal sequence of the second physical uplink control channel format correspond to different expansion factors.

For example, the base station may transmit the configuration information to the user equipment through simple control signaling, and the control signaling may be RRC (Radio Resource Control, radio resource control) signaling, so that overhead of the signaling may be reduced.

Alternatively, when the expansion factor corresponding to the orthogonal sequence of the first physical uplink control channel format is 3 and the expansion factor corresponding to the orthogonal sequence of the second physical uplink control channel format is 6, for examples of the orthogonal sequence of the first physical uplink control channel format and the orthogonal sequence of the second physical uplink control channel format, reference may be made to the description in the embodiment shown in FIG. 1. In addition, for examples of an orthogonal sequence pair formed by the orthogonal sequence of the first physical uplink control channel format and the orthogonal sequence of the second physical uplink control channel format, reference may also be made to the description in the embodiment shown in FIG. 1.

Alternatively, when the expansion factor corresponding to the orthogonal sequence of the first physical uplink control channel format is 2 and the expansion factor corresponding to the orthogonal sequence of the second physical uplink control channel format is 6, for examples of the orthogonal sequence of the first physical uplink control channel format and the orthogonal sequence of the second physical uplink control channel format, reference may be made to the description in the embodiment shown in FIG. 1. In addition, for examples of an orthogonal sequence pair formed by the orthogonal sequence of the first physical uplink control channel format and the orthogonal sequence of the second physical uplink control channel format, reference may also be made to the description in the embodiment shown in FIG. 1.

Alternatively, when the expansion factor corresponding to the orthogonal sequence of the first physical uplink control channel format is 2 and the expansion factor corresponding to the orthogonal sequence of the second physical uplink control channel format is 4, for examples of the orthogonal sequence of the first physical uplink control channel format and the orthogonal sequence of the second physical uplink control channel format, reference may be made to the description in the embodiment shown in FIG. 1. In addition, for examples of an orthogonal sequence pair formed by the orthogonal sequence of the first physical uplink control channel format and the orthogonal sequence of the second physical uplink control channel format, reference may also be made to the description in the embodiment shown in FIG. 1.

In this embodiment, the first physical uplink control channel format and the second physical uplink control channel format adopt different expansion factors, so not only a proper channel format may be adaptively selected according to the change of the feedback information, but also the number of feedback bits supported by one subframe is improved to a great extent.

Alternatively, the method for transmitting configuration information may also include:

302, the base station receives feedback information transmitted by the user equipment through one of the first physical uplink control channel format and the second physical uplink control channel format.

A channel format for transmitting the feedback information by the user equipment is selected by the user equipment according to an effective load of CSI of multiple cells reported in one subframe, and the CSI of the multiple cells are CSI of multiple serving cells of the user equipment or CSI of multiple activated cells.

Specifically, when the effective load is smaller than or equal to a first threshold, the second physical uplink control channel format is used for transmitting the CSI of the multiple cells. When the effective load is bigger than the first threshold and smaller than or equal to a second threshold, the first physical uplink control channel format is used for transmitting the CSI of the multiple cells. When the effective load is bigger than the second threshold, the first physical uplink control channel format is used for transmitting a part of the effective load which is smaller than or equal to the second threshold, wherein, the part of the effective load which is smaller than or equal to the second threshold includes an effective load which is smaller than or equal to the second threshold obtained by deleting a part of the effective load according to the priority of the CSI of the multiple cells.

Figure 4:
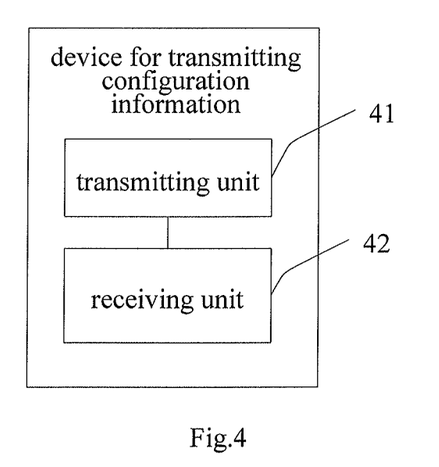
FIG. 4 is a schematic diagram of a structure of a device for transmitting configuration information provided in an embodiment of the present disclosure.

FIG. 4 shows a device for transmitting configuration information provided in an embodiment of the present disclosure. The device includes a transmitting unit 41.

The transmitting unit 41 is configured to transmit the configuration information to a user equipment, the configuration information indicates a first physical uplink control channel format and a second physical uplink control channel format configured for the user equipment by the base station; and the orthogonal sequence of the first physical uplink control channel format and an orthogonal sequence of the second physical uplink control channel format correspond to different expansion factors.

For example, the base station may transmit the configuration information to the user equipment through simple control signaling, and the control signaling may be RRC signaling, so that overhead of the signaling may be reduced.

Alternatively, when the expansion factor corresponding to the orthogonal sequence of the first physical uplink control channel format is 3 and the expansion factor corresponding to the orthogonal sequence of the second physical uplink control channel format is 6, for examples of the orthogonal sequence of the first physical uplink control channel format and the orthogonal sequence of the second physical uplink control channel format, reference may be made to the description in the embodiment shown in FIG. 1. In addition, for examples of an orthogonal sequence pair formed by the orthogonal sequence of the first physical uplink control channel format and the orthogonal sequence of the second physical uplink control channel format, reference may also be made to the description in the embodiment shown in FIG. 1.

Alternatively, when the expansion factor corresponding to the orthogonal sequence of the first physical uplink control channel format is 2 and the expansion factor corresponding to the orthogonal sequence of the second physical uplink control channel format is 6, for examples of the orthogonal sequence of the first physical uplink control channel format and the orthogonal sequence of the second physical uplink control channel format, reference may be made to the description in the embodiment shown in FIG. 1. In addition, for examples of an orthogonal sequence pair formed by the orthogonal sequence of the first physical uplink control channel format and the orthogonal sequence of the second physical uplink control channel format, reference may also be made to the description in the embodiment shown in FIG. 1.

Alternatively, when the expansion factor corresponding to the orthogonal sequence of the first physical uplink control channel format is 2 and the expansion factor corresponding to the orthogonal sequence of the second physical uplink control channel format is 4, for examples of the orthogonal sequence of the first physical uplink control channel format and the orthogonal sequence of the second physical uplink control channel format, reference may be made to the description in the embodiment shown in FIG. 1. In addition, for examples of an orthogonal sequence pair formed by the orthogonal sequence of the first physical uplink control channel format and the orthogonal sequence of the second physical uplink control channel format, reference may also be made to the description in the embodiment shown in FIG. 1.

In this embodiment, the first physical uplink control channel format and the second physical uplink control channel format adopt different expansion factors, so not only a proper channel format may be adaptively selected according to the change of the feedback information, but also the number of feedback bits supported by one subframe is improved to a great extent.

Alternatively, the device for transmitting configuration information may also include a receiving unit 42.

The receiving unit 42 is configured to receive feedback information transmitted by the user equipment through one of the first physical uplink control channel format and the second physical uplink control channel format.

A channel format for transmitting the feedback information by the user equipment is selected by the user equipment according to an effective load of CSI of multiple cells reported in one subframe, and the CSI of the multiple cells are CSI of multiple serving cells of the user equipment or CSI of multiple activated cells.

Specifically, when the effective load is smaller than or equal to a first threshold, the second physical uplink control channel format is used for transmitting the CSI of the multiple cells. When the effective load is bigger than the first threshold and smaller than or equal to a second threshold, the first physical uplink control channel format is used for transmitting the CSI of the multiple cells. When the effective load is bigger than the second threshold, the first physical uplink control channel format is used for transmitting a part of the effective load which is smaller than or equal to the second threshold, wherein, the part of the effective load which is smaller than or equal to the second threshold includes an effective load which is smaller than or equal to the second threshold, obtained by deleting a part of the effective load according to the priority of the CSI of the multiple cells.

Figure 5:
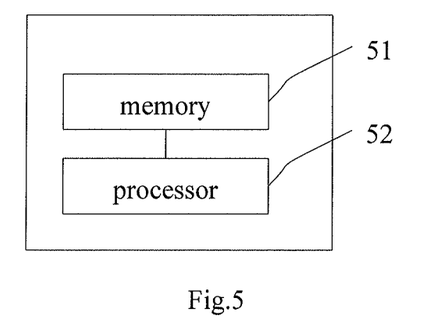
FIG. 5 is a schematic diagram of a structure of user equipment provided in an embodiment of the present disclosure.

FIG. 5 shows a user equipment provided in the embodiment. The equipment includes a memory 51 and a processor 52.

The memory 51 is configured to store at least one group of physical uplink control channel formats.

Each group of the physical uplink control channel formats includes a pair of physical uplink control channel formats, and an orthogonal sequence of each physical uplink control channel format in the pair of physical uplink control channel formats corresponds to a different expansion factor. For an example of the pair of physical uplink control channel formats, reference may be made to the description of the first physical uplink control channel format and the second physical uplink control channel format in the embodiment shown in FIG. 1, which will not be repeated redundantly herein.

The processor 52 is configured to receive configuration information transmitted by a base station, wherein the configuration information indicates a group of physical uplink control channel formats configured for the user equipment by the base station; and to select one in the group of physical uplink control channel formats configured for the user equipment by the base station to transmit feedback information.

For example, the configuration information can be RRC signaling which may be transmitted by the base station. In this way, overhead of the signaling may be reduced through a simple control signaling.

Further, the processor 52 is also configured to select one of the first physical uplink control channel format and the second physical uplink control channel format according to an effective load of CSI of multiple cells reported in one subframe to transmit the feedback information.

The CSI of the multiple cells are CSI of multiple serving cells of the user equipment or CSI of multiple activated cells.

Further, the processor 52 is also configured to select, when the effective load is smaller than or equal to a first threshold, the second physical uplink control channel format to transmit the CSI of the multiple cells.

Further, the processor 52 is also configured to select, when the effective load is bigger than the first threshold and smaller than or equal to a second threshold, the second physical uplink control channel format to transmit the CSI of the multiple cells.

Further, the processor 52 is also configured to delete, when the effective load is bigger than the second threshold, a part of the effective load according to the priority of the CSI of the multiple cells, so that the effective load is smaller than or equal to the second threshold.

Specifically, the processor 52 deletes the part of the effective load in the CSI according to the priority sequence, namely, the CSI with low priority is deleted first, so that the effective load is smaller than or equal to the second threshold. Under a condition that the priorities are the same, according to the sequence of the cells in a serving cell index table ServeCellIndex, the CSI with the smallest sequence is reserved.

In this embodiment, the first physical uplink control channel format and the second physical uplink control channel format adopt different expansion factors, so not only may a proper channel format be adaptively selected according to the change of the feedback information, but also the number of feedback bits supported by one subframe is improved to a great extent.

The device for transmitting information provided in the embodiments of the present disclosure may implement the embodiments of the above-mentioned method. For specific functional implementation, please refer to illustration in the embodiments of the method, which will not be repeated redundantly herein. The method and the device for transmitting information provided in the embodiments of the present disclosure may be applied in the field of communication systems, but not limited to this.

It should be appreciated by those of ordinary skill in the art that all or a part of the procedures in the method of the above-mentioned embodiments may be implemented with a computer program instructing corresponding hardware. The program may be stored in a computer readable storage medium. When the program is executed, the procedures of the embodiments of the above-mentioned method may be included. Wherein, the storage medium may be a magnetic disk, an optical disk, a read-only memory (Read-Only Memory, ROM), a random access memory (Random Access Memory, RAM) or the like.

The foregoing descriptions are merely specific embodiments of the present disclosure, rather than limiting the protection scope of the present disclosure. Any change or substitution that is readily conceived for any one skilled in the art within the technical scope disclosed by the disclosure shall fall into the protection scope of the disclosure. Therefore, the protection scope of the present disclosure shall be defined by the claims.

What is claimed is:

1. A method for transmitting feedback information, implemented on a user equipment that includes a processor and a non-transitory storage medium having code instructions stored therein, when the code is executed by the processor, the user equipment performs the method comprising:
    acquiring, by the user equipment, a first physical uplink control channel format and a second physical uplink control channel format configured for the user equipment by a base station, wherein an orthogonal sequence of the first physical uplink control channel format and an orthogonal sequence of the second physical uplink control channel format correspond to different expansion factors, an expansion factor corresponding to the orthogonal sequence of the second physical uplink control channel format is an integral multiple of an expansion factor corresponding to the orthogonal sequence of the first physical uplink control channel format, the orthogonal sequence of the second physical uplink control channel format is an expansion or repetition of the orthogonal sequence of the first physical uplink control channel format; and
    selecting, by the user equipment, one of the first physical uplink control channel format and the second physical uplink control channel format to transmit the feedback information, wherein the feedback information is channel state information (CSI), the selecting, by the user equipment, one of the first physical uplink control channel format and the second physical uplink control channel format to transmit the feedback information comprises:
    selecting, by the user equipment, the second physical uplink control channel format to transmit the CSI of multiple cells when an effective load of the CSI of the multiple cells is smaller than or equal to a first threshold;
    selecting, by the user equipment, the first physical uplink control channel format to transmit the CSI of the multiple cells when the effective load of the CSI of the multiple cells is bigger than the first threshold and smaller than or equal to a second threshold;
    deleting, by the user equipment, a part of the effective load according to the priority sequence of the CSI when the effective load of the CSI of the multiple cells is bigger than the second threshold, so that the effective load is smaller than or equal to the second threshold.

2. The method for transmitting feedback information according to claim 1, wherein:
    an expansion factor corresponding to the orthogonal sequence of the first physical uplink control channel format is 3, and the orthogonal sequence of the first physical uplink control channel format comprises at least one orthogonal sequence of [1 1 1], [1 $e^{j2\pi/3}$ $e^{j4\pi/3}$] and [1 $e^{j4\pi/3}$ $e^{j2\pi/3}$]; and
    an expansion factor corresponding to the orthogonal sequence of the second physical uplink control channel format is 6, and the orthogonal sequence of the second physical uplink control channel format comprises at least one orthogonal sequence of [1 1 1 1 1 1], [1 $e^{j2\pi/3}$ $e^{j4\pi/3}$ 1 $e^{j2\pi/3}$ $e^{j4\pi/3}$], [1 $e^{j4\pi/3}$ $e^{j2\pi/3}$ 1 $e^{j4\pi/3}$ $e^{j2\pi/3}$], [1 1 1 −1 −1 −1], [1 $e^{j2\pi/3}$ $e^{j4\pi/3}$ −1 −$e^{j2\pi/3}$ −$e^{j4\pi/3}$] and [1 $e^{j4\pi/3}$ $e^{j2\pi/3}$ −1 −$e^{j4\pi/3}$ −$e^{j2\pi/3}$].

3. The method for transmitting feedback information according to claim 1, wherein:
    an expansion factor corresponding to the orthogonal sequence of the first physical uplink control channel format is 2, and the orthogonal sequence of the first physical uplink control channel format comprises at least one orthogonal sequence of [1 1] and [1 −1]; and
    an expansion factor corresponding to the orthogonal sequence of the second physical uplink control channel format is 6, and the orthogonal sequence of the second physical uplink control channel format comprises at least one orthogonal sequence of [1 1 1 1 1 1], [1 −1 1 −1 1 −1], [1 1 $e^{j2\pi/3}$ $e^{j2\pi/3}$ $e^{j4\pi/3}$ $e^{j4\pi/3}$], [1 −1 $e^{j2\pi/3}$ −$e^{j2\pi/3}$ $e^{j4\pi/3}$ −$e^{j4\pi/3}$], [1 1 $e^{j4\pi/3}$ $e^{j4\pi/3}$ $e^{j2\pi/3}$ −$e^{j2\pi/3}$] and [1 −1 $e^{j4\pi/3}$ −$e^{j4\pi/3}$ $e^{j2\pi/3}$ −$e^{j2\pi/3}$].

4. A method for transmitting configuration information, implemented on a base station that includes a processor and a non-transitory storage medium having code instructions stored therein, when the code is executed by the processor, the base station performs the method comprising:
    transmitting, by the base station, the configuration information to a user equipment, the configuration information indicates a first physical uplink control channel format and a second physical uplink control channel format configured for the user equipment by the base station, wherein an orthogonal sequence of the first physical uplink control channel format and an orthogonal sequence of the second physical uplink control channel format correspond to different expansion factors, an expansion factor corresponding to the orthogonal sequence of the second physical uplink control channel format is an integral multiple of an expansion factor corresponding to the orthogonal sequence of the first physical uplink control channel format, the orthogonal sequence of the second physical uplink control channel format is an expansion or repetition of the orthogonal sequence of the first physical uplink control channel format, wherein the second physical uplink control channel format is used for transmitting channel state information (CSI) of multiple cells when an effective load of the CSI of the multiple cells is smaller than or equal to a first threshold, the first physical uplink control channel format is used for transmitting the CSI of the multiple cells when the effective load of the CSI of the multiple cells is bigger than the first threshold and smaller than or equal to a second threshold, the first physical uplink control channel format is used for transmitting a part of the effective load of the CSI of the multiple cells which is smaller than or equal to the second threshold when the effective load of the CSI of the multiple cells is bigger than the second threshold, wherein the part of the effective load of the CSI of the multiple cells which is smaller than or equal to the second threshold includes an effective load which is smaller than or equal to the second threshold obtained by deleting a part of the effective load according to the priority of the CSI of the multiple cells.

5. The method for transmitting configuration information according to claim 4, wherein:
an expansion factor corresponding to the orthogonal sequence of the first physical uplink control channel format is 2, and the orthogonal sequence of the first physical uplink control channel format is at least one orthogonal sequence of [1 1] and [1 −1]; and
an expansion factor corresponding to the orthogonal sequence of the second physical uplink control channel format is 4, and the orthogonal sequence of the second physical uplink control channel format is at least one orthogonal sequence of [1 1 1 1], [1 −1 1 −1], [1 1 −1 −1] and [1 −1 −1 1].

6. A device for transmitting feedback information, comprising a processor and a non-transitory storage medium accessible to the processor, the non-transitory storage medium configured to store programming for execution by the processor, the programming including instructions to:
acquire a first physical uplink control channel format and a second physical uplink control channel format configured for a user equipment by a base station, wherein an orthogonal sequence of the first physical uplink control channel format and an orthogonal sequence of the second physical uplink control channel format correspond to different expansion factors, an expansion factor corresponding to the orthogonal sequence of the second physical uplink control channel format is an integral multiple of an expansion factor corresponding to the orthogonal sequence of the first physical uplink control channel format, the orthogonal sequence of the second physical uplink control channel format is an expansion or repetition of the orthogonal sequence of the first physical uplink control channel format; and
select one of the first physical uplink control channel format and the second physical uplink control channel format to transmit the feedback information, wherein the feedback information is channel state information (CSI), the selecting one of the first physical uplink control channel format and the second physical uplink control channel format to transmit the feedback information comprises:
selecting the second physical uplink control channel format to transmit the CSI of multiple cells when an effective load of the CSI of the multiple cells is smaller than or equal to a first threshold;
selecting the first physical uplink control channel format to transmit the CSI of the multiple cells when the effective load of the CSI of the multiple cells is bigger than the first threshold and smaller than or equal to a second threshold;
deleting a part of the effective load according to the priority sequence of the CSI when the effective load of the CSI of the multiple cells is bigger than the second threshold, so that the effective load is smaller than or equal to the second threshold.

7. The device for transmitting feedback information according to claim 6, wherein:
an expansion factor corresponding to the orthogonal sequence of the first physical uplink control channel format is 3, and the orthogonal sequence of the first physical uplink control channel format is at least one orthogonal sequence of [1 1 1], [1 $e^{j2\pi/3}$ $e^{j4\pi/3}$] and [1 $e^{j4\pi/3}$ $e^{j2\pi/3}$]; and
an expansion factor corresponding to the orthogonal sequence of the second physical uplink control channel format is 6, and the orthogonal sequence of the second physical uplink control channel format is at least one orthogonal sequence of [1 1 1 1 1 1], [1 $e^{j2\pi/3}$ $e^{j4\pi3}$ 1 $e^{j2\pi3}$ $e^{j4\pi3}$], [1 $e^{j4\pi/3}$ $e^{j2\pi/3}$ 1 $e^{j4\pi/3}$ $e^{j2\pi/3}$], [1 1 1 −1 −1 −1], [1 $e^{j2\pi/3}$ $e^{j4\pi/3}$ −1 −$e^{j2\pi/3}$ −$e^{j4\pi/3}$] and [1 $e^{j4\pi/3}$ $e^{j2\pi/3}$ −1 −$e^{j4\pi/3}$ −$e^{j2\pi/3}$].

8. The device for transmitting feedback information according to claim 6, wherein:
an expansion factor corresponding to the orthogonal sequence of the first physical uplink control channel format is 2, and the orthogonal sequence of the first physical uplink control channel format comprises at least one orthogonal sequence of [1 1] and [1 −1]; and
an expansion factor corresponding to the orthogonal sequence of the second physical uplink control channel format is 6, and the orthogonal sequence of the second physical uplink control channel format comprises at least one orthogonal sequence of [1 1 1 1 1 1], [1 −1 1 −1 1 −1], [1 1 $e^{j2\pi/3}$ $e^{j2\pi/3}$ $e^{j4\pi/3}$ $e^{j4\pi/3}$], [1 −1 $e^{j2\pi/3}$ −$e^{j2\pi/3}$ $e^{j4\pi/3}$ −$e^{j4\pi/3}$], [1 1 $e^{j4\pi/3}$ −$e^{j4\pi/3}$ $e^{j2\pi/3}$ −$e^{j2\pi/3}$] and [1 −1 $e^{j4\pi/3}$ −$e^{j4\pi/3}$ $e^{j2\pi/3}$ −$e^{j2\pi/3}$].

9. A device for transmitting configuration information, comprising
a transmitter, configured to transmit the configuration information to a user equipment, the configuration information indicates a first physical uplink control channel format and a second physical uplink control channel format configured for the user equipment by a base station, wherein an orthogonal sequence of the first physical uplink control channel format and an orthogonal sequence of the second physical uplink control channel format correspond to different expansion factors, an expansion factor corresponding to the orthogonal sequence of the second physical uplink control channel format is an integral multiple of an expansion factor corresponding to the orthogonal sequence of the first physical uplink control channel format, the orthogonal sequence of the second physical uplink control channel format is an expansion or repetition of the orthogonal sequence of the first physical uplink control channel format, wherein the second physical uplink control channel format is used for transmitting channel state information (CSI) of multiple cells when an effective load of the CSI of the multiple cells is smaller than or equal to a first threshold, the first physical uplink control channel format is used for transmitting the CSI of the multiple cells when the effective load of the CSI of the multiple cells is bigger than the first threshold and smaller than or equal to a second threshold, the first physical uplink control channel format is used for transmitting a part of the effective load of the CSI of the multiple cells which is smaller than or equal to the second threshold when the effective load of the CSI of the multiple cells is bigger than the second threshold, wherein the part of the effective load of the CSI of the multiple cells which is smaller than or equal to the second threshold includes an effective load which is smaller than or equal to the second threshold obtained by deleting a part of the effective load according to the priority of the CSI of the multiple cells.

10. The device for transmitting configuration information according to claim 9, wherein:
an expansion factor corresponding to the orthogonal sequence of the first physical uplink control channel format is 2, and the orthogonal sequence of the first physical uplink control channel format comprises at least one orthogonal sequence of [1 1] and [1 −1]; and
an expansion factor corresponding to the orthogonal sequence of the second physical uplink control channel format is 4, and the orthogonal sequence of the second physical uplink control channel format comprises at least one orthogonal sequence of [1 1 1 1], [1 −1 1 −1], [1 1 −1 −1] and [1 −1 −1 1].

* * * * *